Aug. 11, 1931.   A. B. MUELLER   1,818,499
HOLDER FOR PROJECTION APPARATUS
Filed Aug. 31, 1929   3 Sheets-Sheet 3
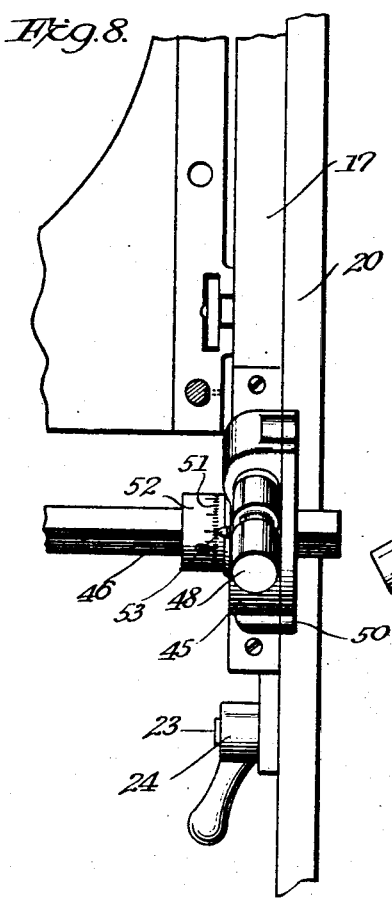
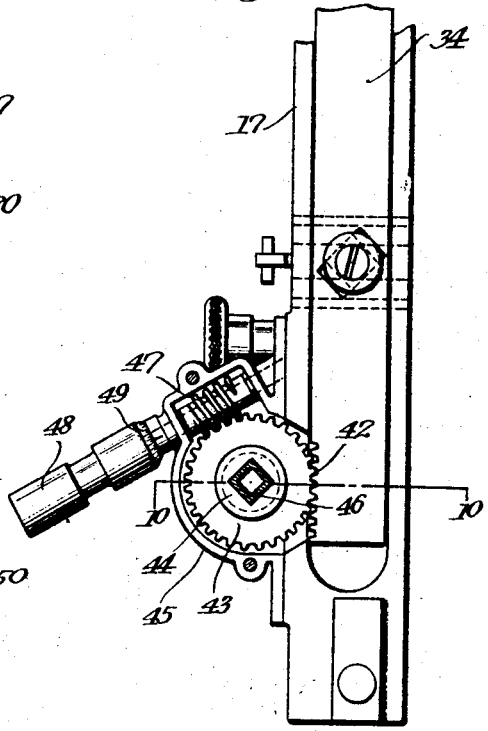
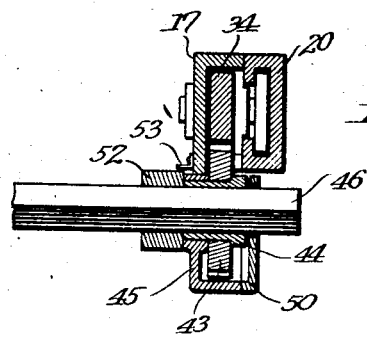
Inventor
Albert B. Mueller
By Emery, Booth, Varney & Holcombe
his Attorneys Patented Aug. 11, 1931

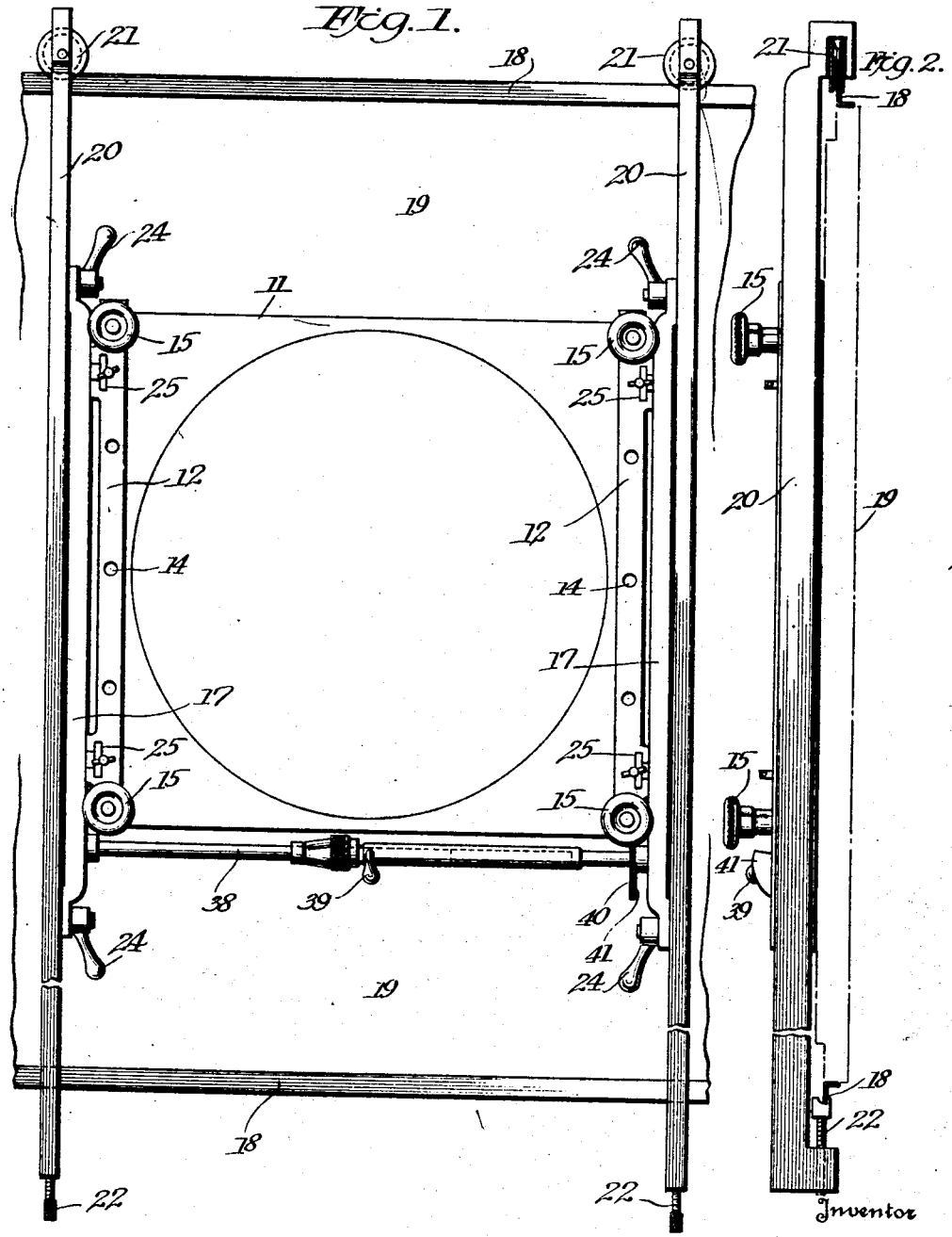

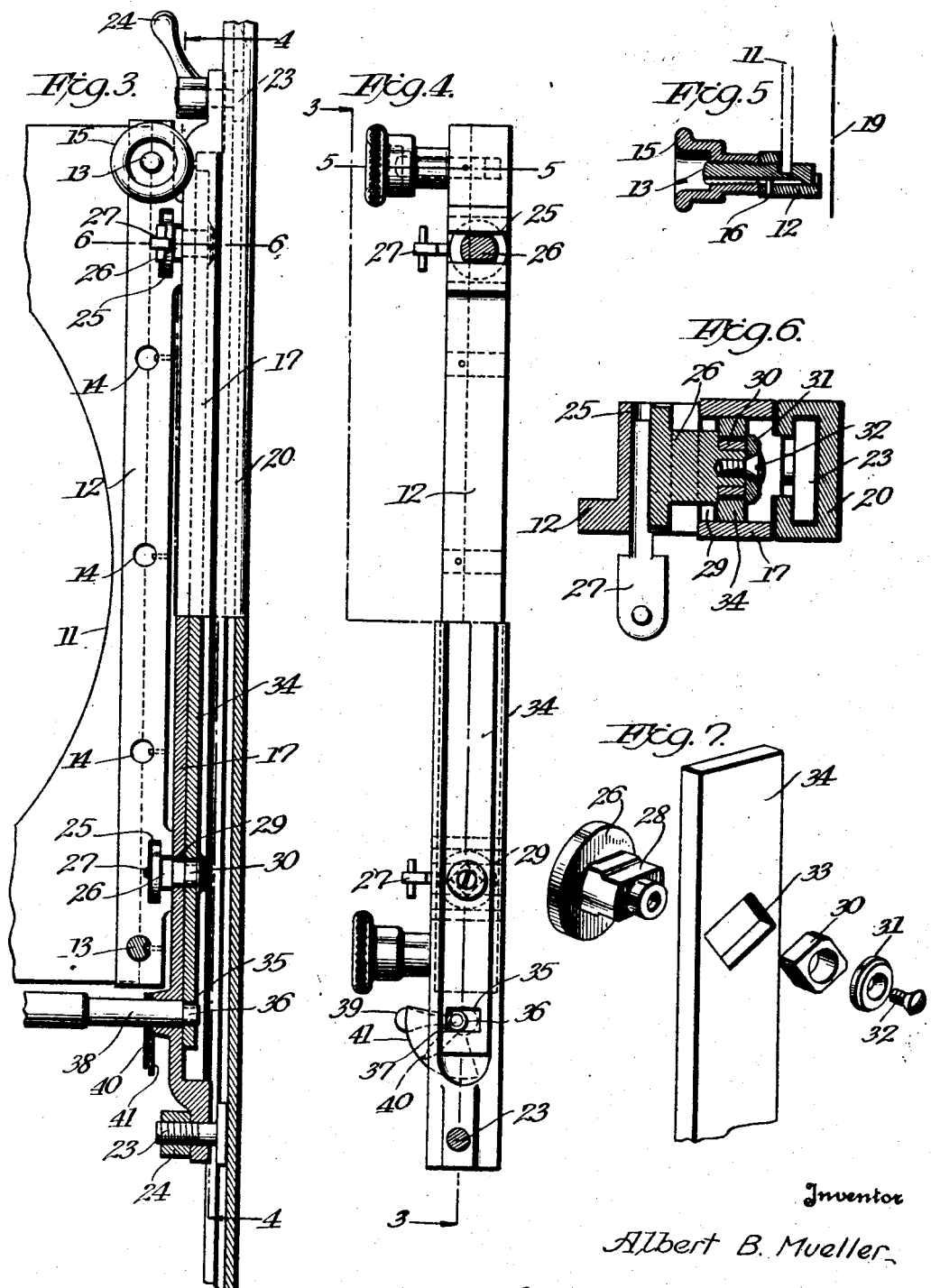

1,818,499

UNITED STATES PATENT OFFICE

ALBERT B. MUELLER, OF CHICAGO, ILLINOIS, ASSIGNOR TO POSTERGRAPH, INC., OF CLEVELAND, OHIO, A CORPORATION OF OHIO

HOLDER FOR PROJECTION APPARATUS

Application filed August 31, 1929. Serial No. 389,821.

This invention relates to apparatus for projecting images through a line or grain screen or filter upon a sensitized photographic plate, and is particularly intended for projecting images upon printing plates.

The invention aims to provide a readily adjustable means for positioning such screens, filters or other parts of projection and like apparatus, both in the plane of the screen or filter, and in a direction perpendicular thereto.

Further aims and objects of the invention are to insure accuracy and certainty of adjustment at any predetermined distance from the plate or sensitized surface, notwithstanding irregularities in the thickness of the latter or in its mounting; and to permit the removal and replacement of the plates with facility.

An illustrative embodiment of the invention is shown in the accompanying drawings, wherein Fig. 1 is a face view of a preferred form of holder, showing a screen in position therein;

Fig. 2 is a side view thereof, showing in dot and dash lines the relative position of the plate holder;

Fig. 3 is an enlarged face view, partly in section, showing a portion of the framework comprising the adjusting and clamping means, the section being taken on the line 3—3 in Fig. 4, looking in the direction of the arrows;

Fig. 4 is a cross-section of the same on the line 4—4 in Fig. 3, looking in the direction of the arrows;

Fig. 5 is an axial cross-section of the clamp for the screen or filter frame, on the line 5—5 in Fig. 4;

Fig. 6 is an enlarged cross-section through the framework at one of the adjusting bolts; on the line 6—6 in Fig. 3;

Fig. 7 is an isometric view of the adjusting bolt and bar in disassembled relation;

Fig. 8 is a view similar to Fig. 3, showing a modified form of adjusting shaft and connection with the adjusting bars;

Fig. 9 is a side view of the same, showing the adjusting screw housing with its cover removed; and Fig. 10 is a cross-section of the same on the line 10—10 in Fig. 9.

In the form of device shown in the drawings, the screen or filter frame 11 (see Figs. 1 and 3), which may be of a size suited to the type of screen or filter and character of the work in hand, is clamped securely in the two side frames 12, which may be made of aluminum or other light, strong material. For this purpose, clamp bolts 13, having suitable notches to engage the edge of the screen or filter frame 11, are inserted in one or another of a series of holes 14 in the side frames 12, and drawn into place by the knurled nuts 15 to clamp the side edges of the screen or filter frame to the side frames. Pins 16 fixed in the side frames 12 engage in slots in the clamp bolts (see Fig. 5) and hold them against turning. These pins also keep the clamp bolts from falling out of the holes 14 when the screen or filter frame is not in place.

The screen or filter in the device shown is held in an adjustable sliding frame for positioning it both lengthwise and crosswise with respect to the sensitized plate, this frame as shown being suspended from an angle iron trackway 18 on the plate holder 19 by means of side bars 20 provided with rollers 21 at their upper ends running on the trackway.

Screw clamps 22 are provided at the lower ends of the side bars 20 for securing them to the trackways in adjusted position. The side bars 20 are provided with T-slots on their inner sides, within which are slidably mounted T-bolts 23 (see Fig. 3) provided with clamp nuts 24, or other suitable fastening means, by which the sliding frame 17 may be secured in adjusted position lengthwise of the side bars 20. The side bars 20 are long enough to provide the desired range of adjustment.

The sliding frame 17 is provided with suitable means for adjusting the screen or filter frame towards and away from the plate holder 19, and for adjusting it to suit any unevenness in the plate or distortion or misalinement of the plate holder and frame. Each side frame 12 is provided with cross T- slots 25 near its ends for receiving the cylindrical flat head of a T-bolt 26 (see Figs. 6 and 7). A groove is formed in the inner wall of each slot 25 to receive a locking pin 27 having a flat side to engage the flat head of the T-bolt 26 for securing the latter in the T-slot. The shanks 28 of the T-bolts 26 are flattened to engage in cross-slots 29 in the sliding frame 17, for guiding the T-bolts in a direction perpendicular to the plate holder 19. The extremity of the shank of each T-bolt is cylindrical to form a bearing for a slide block 30, which may be secured thereto by a washer 31 and screw 32, or other suitable means. The slide blocks 30 each engage in a diagonal slot 33, formed one in each end of the two flat adjuster bars 34, slidably mounted one in each side of the sliding frame 17. The adjuster bars are connected for simultaneous operation by any suitable means.

In the form of device illustrated in Figs. 1 to 4, at one end of each adjuster bar is a transverse slot 35, within which engages a roller 36. These rollers are mounted on eccentric bearings 37 on the ends of a telescopic adjusting shaft 38 provided with a handle 39 for rotating it. A pointer 40 on one end of the adjusting shaft is arranged to move over a graduated sector 41 for indicating the extent of rotation of the adjusting shaft. This sector may be graduated to read in thousandths of an inch movement of the sliding frame with respect to the plate holder if desired. It is evident that turning the adjusting shaft 38 will rotate the eccentric and roller, and thereby shift the rod 34 lengthwise, causing the blocks 30 to slide in the grooves 33 and T-bolts 26 to slide cross-wise in the grooves 29 in the sliding frame, thus carrying the screen or filter frame towards or away from the plate holder equally at all four corners.

In the form of device illustrated in Figs. 8, 9 and 10, the adjusting bars 34 are each provided with rack teeth 42 for engagement with one of a pair of gears 43, each provided with a hub or bushing 44, rotatably mounted in a housing 45 secured to each sliding frame 17. The bushings 44 are squared to receive a squared shaft 46 which extends across from one frame to the other, and which may be adjusted in the bushings to suit the size screen in use. A worm 47 is arranged in one of the housings 45 to engage the gear for turning it and holding it in adjusted position. The worm shaft extends through the casing and is fitted with a knurled handle 48 provided with a scale 49 for adjusting it. A cover 50 may be provided for the casing 45. A scale 51 may also be applied to the collar 52 that secures the square shaft 46 axially in the bushing 44 so its angular position may be read directly by means of a pointer 53 on the housing 45.

By adjusting the sliding frame to bear uniformly against the coated plate before tightening the clamp pins 27, taking care that the T-bolts 26 and blocks 30 have all the same bearing in the slots 33 of the adjusting bars, the turning of the adjusting shaft will move the screen or filter holder uniformly away from the plate by such a distance as may be desired, and the same uniform distance may be readily secured for repeated settings. Thus a series of plates may be exposed through the same filter or screen placed at a uniform distance from the respective plates notwithstanding unevenness or differences in the thickness of the coatings thereon.

The filter or screen frame may readily be shifted or removed to permit of changing the plates, and can be reset quickly with exactitude at the same distance from the surface of the plate at all four corners.

The entire apparatus may be constructed of durable, strong, light materials, thereby eliminating undue vibration and distortion of the parts, and facilitating the handling of the plates and setting up the apparatus.

I claim:

1. A holder for a screen or filter having a mounting comprising frame members, means for removably holding the mounting on said frame members, and independent rails slidably supported for holding said frame members, said frame members being adjustable on said rails, and said frame members and rails being held in parallel relation by said mounting.

2. A holder for a screen or filter having a mounting comprising frame members, means for removably holding the mounting on said frame members, and independent rails slidably supported for transverse movement, said rails being provided with longitudinal trackways for said frame members, and means for clamping said frame members in adjusted position on said rails to secure the latter in parallel relation.

3. A holder for a screen or filter having a mounting comprising frame members, means for removably holding the mounting on said frame members, said means providing for adjusting said frame members and mounting in a direction normal to the plane of the screen or filter, and independent rails slidably supported for holding said frame members, said frame members being adjustable on said rails, and said frame members and rails being held in unitary relationship by said mounting in all positions of adjustment.

4. A holder for a screen or filter having a mounting comprising frame members, means for removably holding the mounting on said frame members, said means providing for adjusting said frame members and mounting relatively to each other in a direction normal to the plane of the screen or filter, means for shifting said mounting on said frame members in a direction normal to the plane of the screen or filter independently of said adjustment, and rails slidably supported for holding said frame members, said frame members being adjustable on said rails.

5. A holder for a screen or filter having a mounting, frame members and means for removably securing said mounting thereto, supports for said frame members and means for securing them in adjusted position, and sliding members engaging said frame members and supports and movable lengthwise thereof for providing relative movement between them normal to the plane of said screen or filter.

6. A holder for a screen or filter having a mounting, frame members and means for removably securing said mounting thereto, supports for said frame members and means for securing them in adjusted position, and a plurality of sliding members engaging said frame members and supports for providing relative movement between them normal to the plane of said screen or filter, said sliding members being connected for simultaneous movement.

7. A holder for a screen or filter having a mounting, frame members and means for removably securing said mounting thereto, supports for said frame members and means for securing them in adjusted position, and a plurality of sliding members engaging said frame members and supports for providing relative movement between them normal to the plane of said screen or filter, said sliding members being connected for simultaneous movement, and means for adjusting said sliding members independently with respect to said frame members to provide for individual and simultaneous setting thereof.

8. A holder for a screen or filter comprising frame members, supports for said frame members and means for securing them in adjusted position, stud-bolts engaging in cross-slots in said frame members and supports for providing relative movement between them normal to the plane of said screen or filter.

9. A holder for a screen or filter comprising frame members, supports for said frame members and means for securing them in adjusted position, stud-bolts engaging in cross-slots in said frame members and supports for providing relative movement between them normal to the plane of said screen or filter, adjusting bars carried by said supports having angularly disposed slideways, and means on said stud bolts engaging said slideways whereby movement of said adjusting bars causes crosswise movement of said studs with respect thereto.

10. A holder for a screen or filter comprising side frame members, supports for said frame members and means for securing them in adjusted position, stud-bolts engaging in cross-slots in said frame members and supports for providing relative movement between them normal to the plane of said screen or filter, a pair of adjusting bars carried by said supports, one for each side frame member, having angularly disposed slideways, a cross bar and means associated therewith for shifting said adjusting bars simultaneously, and means on said stud bolts engaging said slideways whereby movement of said adjusting bars causes crosswise movement of said studs with respect thereto.

11. A holder for a screen or filter comprising frame members, supports for said frame members and means for securing them in adjusted position, stud-bolts engaging in cross-slots in said frame members and supports for providing relative movement between them normal to the plane of said screen or filter, and means for clamping said stud-bolts in adjusted position with respect to said frame members.

12. A holder for a screen or filter comprising side frame members, supports for said frame members and means for securing them in adjusted position, stud-bolts engaging in cross-slots in said frame members and supports for providing relative movement between them normal to the plane of said screen or filter, means for clamping said stud-bolts in adjusted position with respect to said frame members, a pair of adjusting bars carried by said supports, one for each side frame member, having angularly disposed slideways, a cross bar and means associated therewith for shifting said adjusting bars simultaneously, and means on said stud bolts engaging said slideways whereby movement of said adjusting bars causes crosswise movement of said studs with respect thereto.

13. A holder for a screen or filter comprising side frame members, supports for said frame members and means for securing them in adjusted position, stud-bolts engaging in cross-slots in said frame members and supports for providing relative movement between them normal to the plane of said screen or filter, a pair of adjusting bars carried by said supports, one for each side frame member, having angularly disposed slideways, a cross bar and means carried by its ends for engaging and shifting said adjusting bars simultaneously, an indicator carried thereby for showing the position of said adjusting bars, and means on said stud bolts engaging said slideways whereby movement of said adjusting bars causes crosswise movement of said studs with respect thereto, and controls the position of said screen or filter in a direction normal to its plane.

14. An adjustable frame for a screen or filter comprising side members having a series of orifices, clamp bolts adapted to be secured in said orifices, said clamp bolts having splines extending from their screw threaded ends nearly to their clamping head ends, and fixed members in said holes adapted to engage in said splines for retaining said bolts.

15. An adjustable frame for a screen or filter comprising side members having a series of orifices, clamp bolts adapted to be secured in said orifices, said clamp bolts having splines extending from their screw threaded ends nearly to their clamping head ends, and fixed members in said holes adapted to engage in said splines for retaining said bolts, said side members being provided with cross-slots for receiving T-bolts and means for clamping said T-bolts therein.

16. A holder for a screen or filter comprising frame members, supports for said frame members and means for securing them in adjusted position, stud-bolts engaging in cross-slots in said frame members and supports for providing relative movement between them normal to the plane of said screen or filter, means for clamping said stud members in adjusted position on said frame members, adjusting bars carried by said supports having angularly disposed slideways, and means on said stud bolts engaging said slideways whereby movement of said adjusting bars causes cross-wise movement of said studs with respect thereto.

17. A holder for a screen or filter having a mounting, frame members and means for removably securing said mounting thereto, supports for said frame members and means for securing them in adjusted position, and a plurality of sliding members engaging said frame members and supports for providing relative movement between them normal to the plane of said screen or filter, said sliding members being connected for simultaneous movement by telescoping shafts permitting relative movement of said supports to vary the distance between said frame members to accommodate different sizes of screen.

18. A holder for a screen or filter having a mounting, frame members and means for removably securing said mounting thereto, supports for said frame members and means for securing them in adjusted position, and a plurality of sliding members engaging said frame members and supports for providing relative movement between them normal to the plane of said screen or filter, said sliding members being connected for simultaneous movement by means permitting relative movement of said supports to vary the distance between said frame members to accommodate different sizes of screen, said means comprising a rack on each sliding member and cooperating gears connected by a cross-shaft having axial movement with respect to said gears.

19. A holder for a screen or filter having a mounting, frame members and means for removably securing said mounting thereto, supports for said frame members and means for securing them in adjusted position, and a plurality of sliding members engaging said frame members and supports for providing relative movement between them normal to the plane of said screen or filter, said sliding members being connected for simultaneous movement by means permitting relative movement of said supports to vary the distance between said frame members to accommodate different sizes of screen, said means comprising a rack on each sliding member and cooperating gears connected by a cross-shaft having axial movement with respect to said gears, and a worm engaging one of said gears for rotating it to adjust said sliding members.

20. A holder for a screen or filter having a mounting, frame members and means for removably securing said mounting thereto, supports for said frame members and means for securing them in adjusted position, and a plurality of sliding members engaging said frame members and supports for providing relative movement between them normal to the plane of said screen or filter, said sliding members being connected for simultaneous movement by means permitting relative movement of said supports to vary the distance between said frame members to accommodate different sizes of screen, said means comprising a rack on each sliding member and cooperating gears connected by a cross-shaft having axial movement with respect to said gears, and a worm engaging one of said gears for rotating it to adjust said sliding members, and means for indicating the angular position of said worm.

In testimony whereof, I have signed my name to this specification.

ALBERT B. MUELLER.